(12) United States Patent
Schreiber et al.

(10) Patent No.: US 6,952,987 B2
(45) Date of Patent: Oct. 11, 2005

(54) METHOD FOR SCROLL-FREE MACHINING ROTATIONALLY SYMMETRICAL SURFACES

(75) Inventors: Leo Schreiber, Schwabisch Gmund (DE); Klaus Trott, Mellrichstadt (DE)

(73) Assignee: Boehringer Werkzeugmaschinen GmbH, Goppingen (DE)

(*) Notice: Subject to any disclaimer, the term of this patent is extended or adjusted under 35 U.S.C. 154(b) by 22 days.

(21) Appl. No.: 10/149,841

(22) PCT Filed: Dec. 18, 2000

(86) PCT No.: PCT/EP00/12913
§ 371 (c)(1),
(2), (4) Date: Jun. 14, 2002

(87) PCT Pub. No.: WO01/43902
PCT Pub. Date: Jun. 21, 2001

(65) Prior Publication Data
US 2003/0089204 A1 May 15, 2003

(30) Foreign Application Priority Data
Dec. 17, 1999 (DE) .......................... 199 61 111
Dec. 30, 1999 (DE) .......................... 199 63 897

(51) Int. Cl.[7] .......................... B23B 1/00; B23B 29/00
(52) U.S. Cl. .......................... 82/1.11; 82/47
(58) Field of Search .................. 82/1.11, 118, 120, 82/123, 133, 137

(56) References Cited

U.S. PATENT DOCUMENTS

| 2,553,966 | A | 5/1951 | Groene | 90/33 |
| 3,616,715 | A | 11/1971 | Shaumyan et al. | 82/2 |
| 5,218,893 | A | 6/1993 | Shikata | 82/1.11 |
| 5,778,745 | A | * 7/1998 | Furusawa et al. | 82/1.11 |
| 6,209,429 | B1 | * 4/2001 | Urso et al. | 82/1.11 |
| 6,508,150 | B1 | * 1/2003 | Bertschinger | 82/1.11 |

FOREIGN PATENT DOCUMENTS

| DE | 42 23 645 A1 | 1/1993 |
| DE | 44 32 514 A1 | 3/1996 |
| EP | 0 911 099 A1 | 4/1999 |

OTHER PUBLICATIONS

Patent Abstracts of Japan, Publication No. 60085801, Publication Date May 15, 1985; Uejima Yasuo, Inventor, Eguro Tekkoshok, Applicant.

* cited by examiner

*Primary Examiner*—Derris H. Banks
*Assistant Examiner*—Dana Ross
(74) *Attorney, Agent, or Firm*—Head, Johnson & Kachigian

(57) ABSTRACT

A process for cutting machining of rotating rotationally symmetrical workpieces with a defined cutting edge, wherein the resulting rotationally symmetrical surface has either no twist or a twist which is only insignificant in terms of transport effect and abrasive action and/or when machining the hardened workpiece surfaces a particularly high material removal rate can be achieved, wherein a cutting edge which is askew with respect to the axis of rotation of the workpiece is guided in contacting relationship along the rotating workpiece in a linear feed movement transversely with respect to the axis of rotation, wherein the machining parameters, in particular the broaching feed and the inclined positioning of the cutting edge are so selected that the twist occurring at the machined surface becomes a minimum in respect of twist pitch and/or twist depth and in particular the twist depth becomes a minimum.

12 Claims, 3 Drawing Sheets

METHOD FOR SCROLL-FREE MACHINING ROTATIONALLY SYMMETRICAL SURFACES

CROSS-REFERENCE TO RELATED APPLICATION

This is an United States National Phase Application entitled "Process for Twist-Free Cutting Machining of Rotationally Symmetrical Surfaces" claiming priority to PCT Application No. PCT/EP00/12913 having an International Filing Date of 18 Dec. 2000, which claims priority to German Application Nos. 19961111.4 filed 17 Dec. 1999 and 19963897.7 filed 30 Dec. 1999.

BACKGROUND OF INVENTION

The invention concerns the cutting machining of rotating, in particular concentric rotationally symmetrical surfaces of a metal workpiece, in particular of steel or cast iron, even in the hardened state, by means of a geometrically defined cutting edge or cutting edges.

The rotary machining of rotationally symmetrical parts both in the soft and also in the hardened state with a geometrically defined cutting edge is state of the art. The processes involving grinding, finishing, honing and similar processes are in part substituted in that respect.

Cutting materials which have a sufficient service life, even for machining hardened workpieces, are available in the meantime in various different forms.

Machining after the hardening operation is generally necessary, even if the preliminary machining operation is effected with a high degree of precision, as, after the hardening process, in part considerable degrees of distortion due to hardening generally occur. A process which restores the dimensional accuracy of the workpiece again is therefore essential.

Longitudinal turning always produces a surface which suffers from a spiral rifling twist thereon, more particularly, irrespective of which material is machined and whether it is hardened or unhardened.

That surface has regular structures (grooves or burr-shaped raised portions) which correspond to a screwthread structure (twist) and which, by virtue of the feed movement of the tool along the rotating workpiece, produce a pitch.

That applies equally to workpiece surfaces which are cylindrical, conical or of some other shape. Therefore the surface to be produced on the workpiece involves for example shapes of a screwthread or portions thereof.

The formula relationship which describes the screwthread depth or roughness of the thread-like structure is described in FIG. 3.

As the cutting machining data, particularly when dealing with hardened workpieces, for high levels of surface quality, are generally very small, this frequently involves a relatively slow machining advance or a low level of machining output.

While the relatively low level of machining output involves a marked economic disadvantage, the twist-bearing surfaces give rise to problems in relation to seals which bear thereagainst, particularly if they are moving relative to the surface, for example a rotating shaft within a stationary seal. Seals in that sense can be for example the known radial shaft sealing rings.

A surface which involves a twist configuration thereon in that fashion, by means of the thread-shaped grooves or burrs, conveys coolant, lubricant etc along the surface and past the seal bearing thereagainst, from one side to the other in the axial direction, so that the sealing action of the seal is considerably reduced. Particularly in the case of machines which for example for reasons of hygiene or also for reasons of environmental protection, must run without leakage, this represents a problem which is to be taken seriously.

In addition, the sealing elements which bear against the surface with the twist configuration thereon suffer a great deal of damage with time at the contact lines or surfaces therebetween, due to those thread-shaped grooves or raised portions, or they are at least subjected to a severe abrasive effect. Due to that wear or damage, the sealing action is also often seriously reduced or eliminated after a short period of time.

If consideration is given to the available cutting machining processes on a rotating workpiece, having regard to those two problematical aspects, the picture which results is as follows:

If, when turning rotationally symmetrical surfaces, the attempt is made to avoid the thread-shaped configuration being formed thereon by the tool being moved relative to the workpiece only radially (plunge-cut turning), then a twist-free surface is produced, because of the absence of any axial movement. If however the plunge-cut cutting edge is as wide in the axial direction as the rotationally symmetrical surface which is to be produced overall, very high cutting forces occur, particularly when machining hardened surfaces, and there is a high tendency to chatter because of dynamic instability. Such dynamic instabilities or chatter result almost all of a sudden in such severe surface irregularities that here the surface is also too irregular to afford satisfactory sealing integrity.

If the plunge-cut cutter is additionally moved lengthwise, that is to say in the axial direction, when dealing with relatively wide surfaces to be produced, then it will be appreciated that a surface with a twist configuration thereon is again produced.

It is therefore state of the art and necessary that the twist produced, in particular the thread-shaped turning grooves or tool marks have to be sufficiently reduced or even entirely eliminated with subsequent expensive additional procedures, in order thereby to ensure a satisfactory sealing action.

One possible way of avoiding the twist configuration on the surface (turning grooves or tool marks) could be the turning broaching process, wherein the broaching tool is moved in the tangential direction past the rotating workpiece. If the individual cutting edges of the turning broaching tool are oriented parallel to the axis of rotation of the tool, this procedure again involves the problems of the high forces acting on the cutting edge, and thus the trend towards dynamic instability and the tendency to chatter.

If the cutting edge is positioned inclinedly in the turning broaching operation, which results in a reduction in the pressure on the cutting edge however, that gives rise to a thread-shaped residual structure as the points of engagement of the cutting edge on the workpiece are at different spacings (radii) from the axis of rotation of the workpiece.

In a turning broaching operation by means of a disc-shaped tool with the cutting edges on the periphery of the tool, inclined positioning of the cutting edge which in itself is straight also gives rise to the problem that in that case the surface produced on the workpiece is a spherically convex surface instead of being an exactly cylindrical surface.

In addition in many cases grinding of the surfaces is applied as an additional procedure. That means that the workpiece generally has to be transposed to another type of machine. The item costs of the workpiece are therefore considerably increased by virtue of the increase in the length of the process chain, that is to say by the use of a further machine, and the economic result is thus significantly worsened. In addition, in regard to final machining of the workpieces, if possible grinding should be avoided as this generally takes place in the form of a wet process and thus further problems in terms of environment and disposal occur in regard to the grinding slurry and in accordance with the present state place a further burden on the economic result.

Added to that is the fact that even in the grinding operation twist structures are produced, which are firstly produced on the grinding disc by the dressing operation and which finally are reproduced on the workpiece. A finishing procedure in which a grinding band or a grinding element is applied to the workpiece also involves the formation of surface structures involving a twist configuration, because of the additional oscillation or longitudinal movement of the finishing tool relative to the workpiece.

SUMMARY OF THE INVENTION

Therefore the object in accordance with the invention is to provide a process for machining rotating rotationally symmetrical workpieces with a defined cutting edge, in which the resulting rotationally symmetrical surface has either no twist or a twist which is only insignificant in terms of a transport effect and an abrasive action and/or a particularly high metal removal rate can be achieved when machining the hardened workpiece surfaces.

In accordance with the invention it has been found that the occurrence of and/or the extent of the screwthread shape on the surface structure produced can be so influenced by the magnitude of the feed speed of the cutting edges in relation to the existing inclined positioning of the cutting edge with respect to the axis of rotation of the workpiece, the predetermined diameter and the rotary speed of the workpiece to be machined, that no twist or a twist which is no longer relevant in a practical context occurs on the machined surface.

A further advantage is that this specific manner in accordance with the invention of implementing broaching machining can be carried out very much more quickly and at lower cost than for example a grinding, finishing or honing machining operation (or a comparable process) for removing the twist structure from the surface.

Thus, the turning broaching process according to the invention can be carried out on a normal turning machine or lathe, as well as on a turning broaching machine with for example a disc-shaped main tool body, if the cutting edge used for the process according to the invention can be moved linearly and transversely, in particular perpendicularly, with respect to the direction of the workpiece, in particular in a tangential direction, past the rotationally symmetrical surface of the workpiece, which is to be machined.

If—depending on the respective use of the workpiece—the aspect of minimizing the twist or freedom from twist on the surfaces to be produced is not to the fore, the machining parameters can be so altered that the surface produced admittedly suffers from a twist thereon, but the metal removal rate can be considerably increased, which is of significance particularly when machining hardened workpieces. That affords inter alia a highly economic process with high levels of surface quality.

DECRIPTION OF THE DRAWINGS

An embodiment in accordance with the invention is described in greater detail by way of example hereinafter with reference to the Figures in which.

Figure 3:
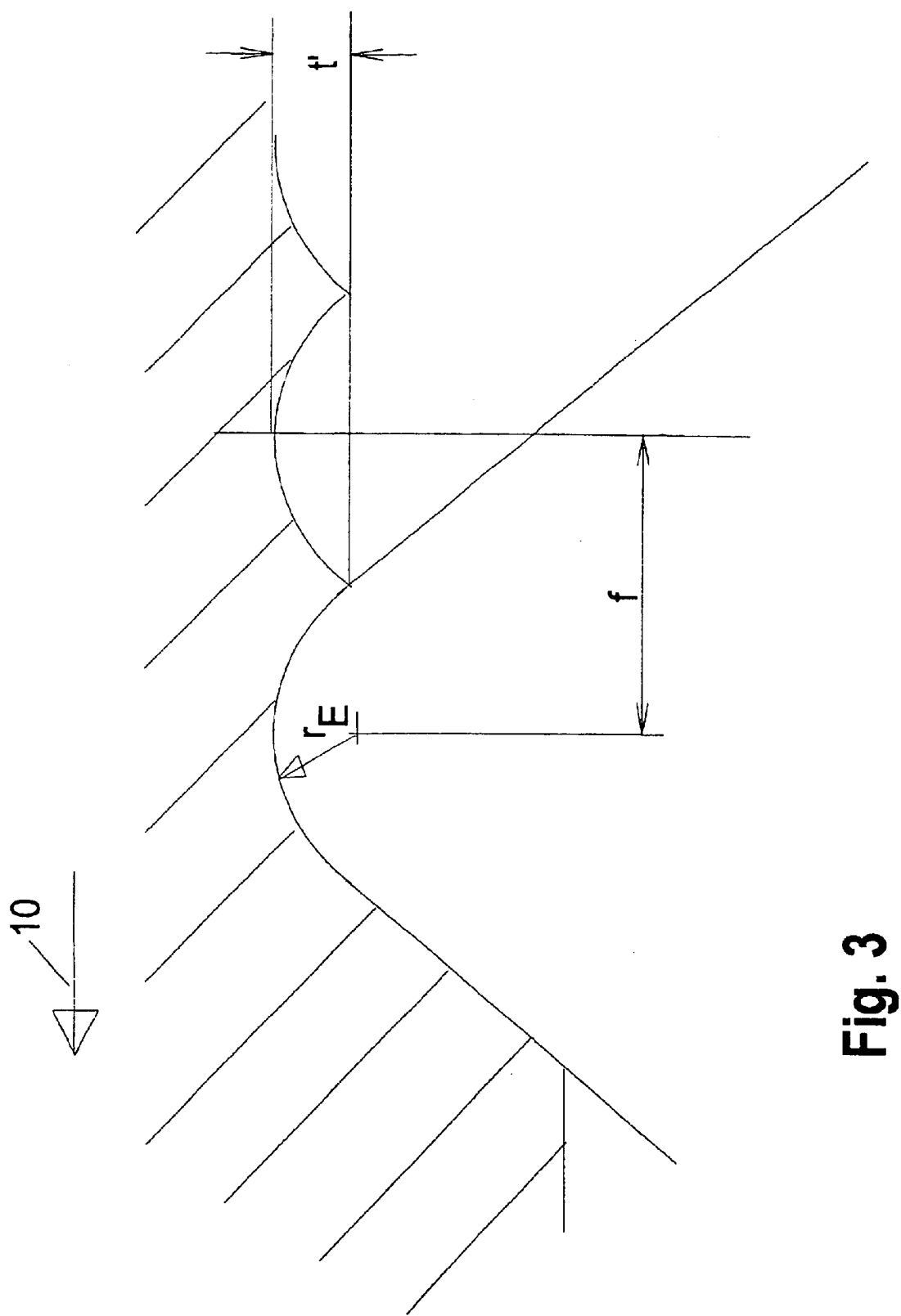
FIG. 3 is a view of the situation when implementing longitudinal turning.

First of all FIG. 3 shows how for example when implementing longitudinal turning a thread-like surface is afforded by the cutting tool which moves in the direction of rotation of the workpiece, and its cutting rounded configuration $r_E$.

DESCRIPTION OF THE PREFERRED EMBODIMENTS

With a uniform advance feed f, expressed in mm/revolution of the workpiece, the result is a helical groove 5, the pitch spacing of which in the direction of the axis of rotation 10 is constant, with a uniform feed f. In this respect, it will be seen that the depth t' of those grooves depends on the size of the corner radius $r_E$ of the cutting tool producing the shape: the greater that corner $r_E$ is, the correspondingly shallower are the flanks of the groove and thus the depth t' becomes correspondingly less. The relationship in terms of a formula reads as follows:

$$t = \frac{f^2}{8 \cdot r_E}$$

In this respect, setting at least one of the edges of the cutter, in particular the secondary cutter, which lead to the cutter corner, at the smallest possible angle, preferably parallel, with respect to the direction of the axis of rotation 10, generally involves the only viable option for minimising the depth t' as, by virtue of predetermined cycle times etc in production the feed f cannot be reduced just as may be desired.

Figure 1:
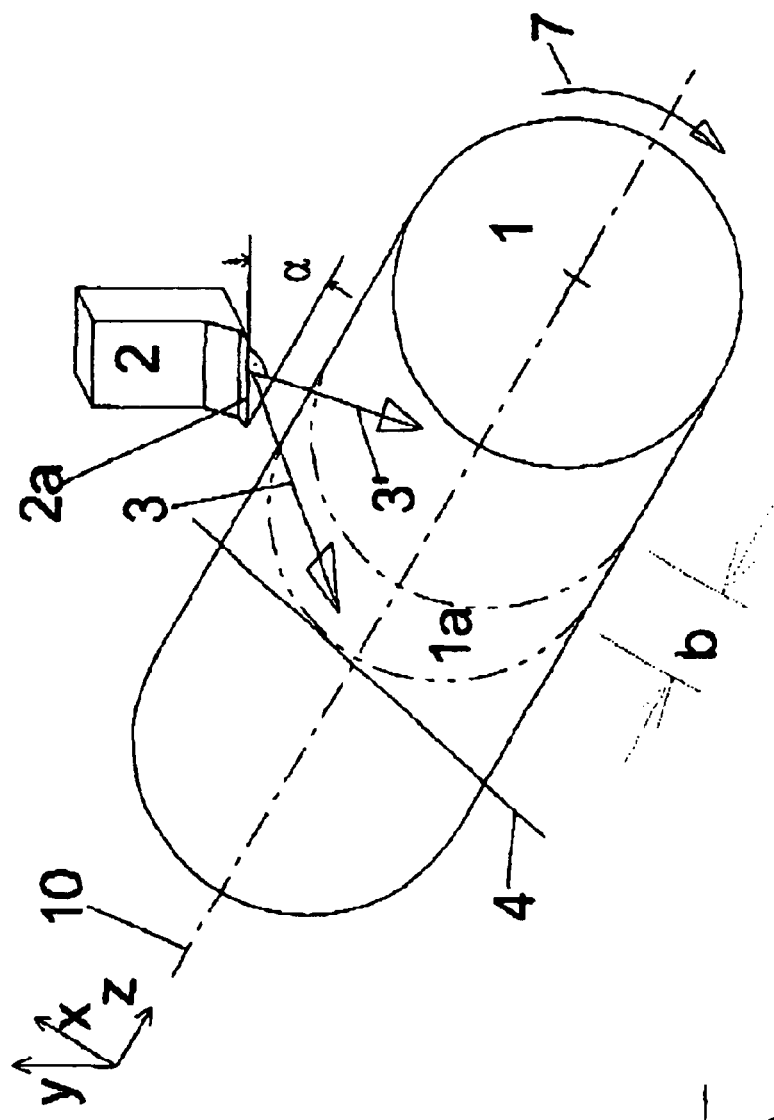
FIG. 1 is a perspective view of the machining situation.
Figure 2:
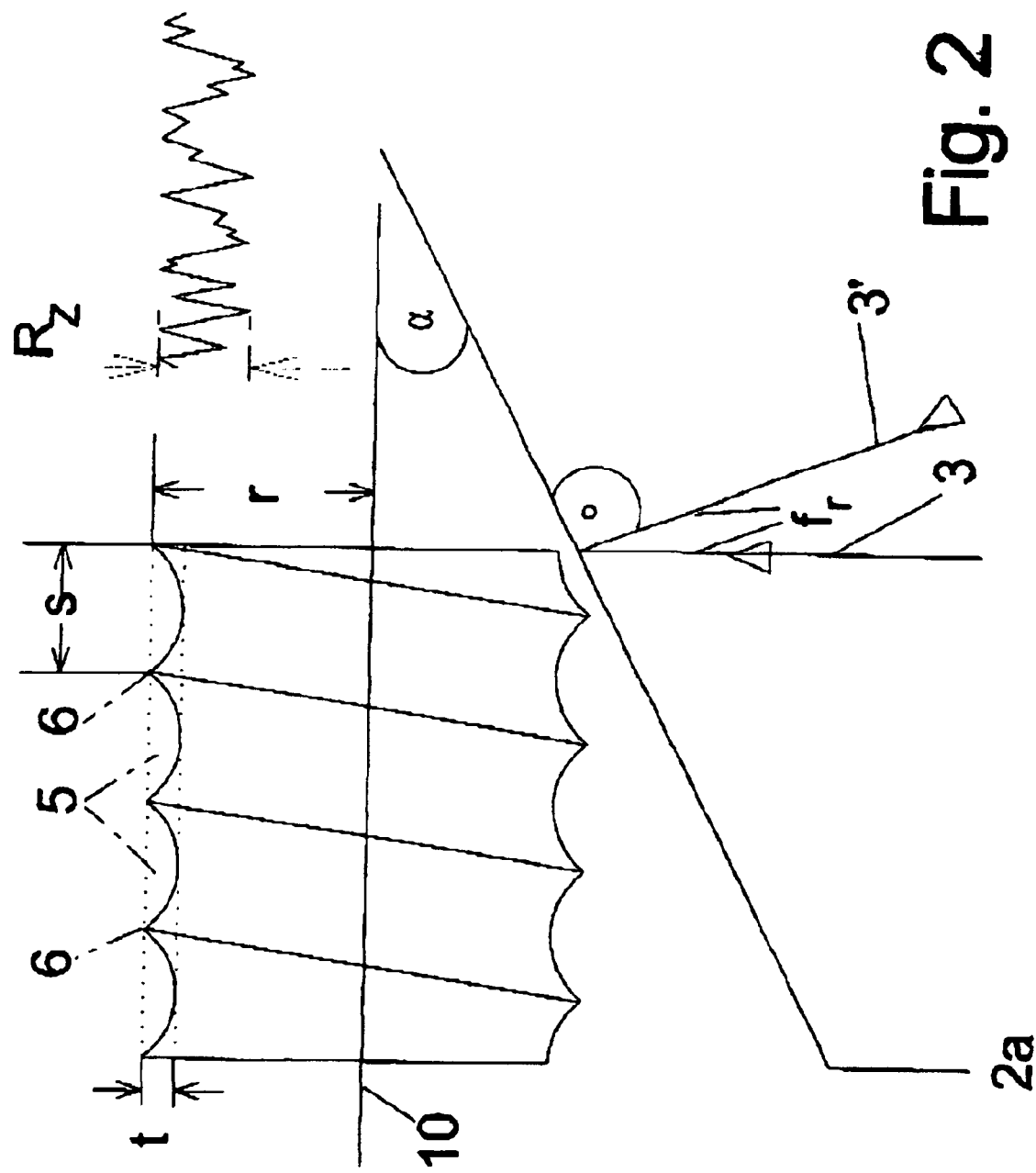
FIG. 2 is a view of the situation in FIG. 1 transversely with respect to the direction of rotation 10 and to the feed movement 3.

In comparison, FIGS. 1 and 2 show the situation according to the invention:

As FIG. 1 shows, the workpiece 1 on which the rotationally symmetrical surface 1a to be machined is disposed rotates about the axis of rotation 10, in the case of turning machines or lathes or turning broaching machines usually referred to as the Z-direction, with the X-direction and the Y-direction usually each being perpendicular thereto.

The rotationally symmetrical surface 1a to be machined is of a width b in the Z-direction and is generally intended to serve as a support surface for a radial shaft sealing ring or comparable element in subsequent use.

The tool 2 is guided along the workpiece, with its cutting edge 2a which is disposed inclinedly with respect to the Z-direction, in a feed direction 3 which is parallel to one of the tangential surfaces at the rotationally symmetrical surface 1a, transversely with respect to the direction of the axis of rotation 10, in such a way that the individual cutting regions successively come into contact with different regions in the Z-direction of the rotationally symmetrical surface 1a, in which respect to the direction extent of the cutting edge 2a in the direction of the axis of rotation, that is to say in the direction of rotation 10, is equal to or greater than the width b of the surface a to be machined. In this case, the feed direction of the tool can be in a plane which is perpendicular to the direction of rotation 10 of the workpiece, that is to say in a radial plane of the workpiece, or in a plane which is disposed inclinedly relative to the direction of rotation 10 (feed direction 3').

Figure 1A:
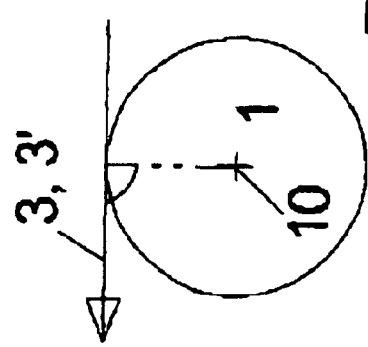

When considered in the direction of rotation 10 of the workpiece the feed direction 3 or 3' however (see FIG. 1a) always represents a tangent to the reference or target diameter of the rotationally symmetrical surface to be machined.

During the machining operation the workpiece 1 rotates in a turning direction 7 in such a way that, in the contact region between the cutting edge 2a and the surface 1a to be machined, the surface of the workpiece 1 runs against the cutting edge 2a.

The view in the Y-direction in FIG. 2 shows the inclined positioning angle α with respect to the direction of rotation 10 of the workpiece 1 and the feed movement 3 of the cutting edge 2a, which in the view is at a right angle to that direction of rotation.

The thread-like surface structure shown in FIG. 2 is produced as a result of the peeling or pairing movement which takes place from the right-hand corner to the left-hand corner of the cutting edge 2a in FIG. 2 in the machining procedure. That surface structure is formed by a thread-like groove 5, the individual turns of which are in directly adjoining relationship in the longitudinal direction of the workpiece, and form between them a thread burr 6.

The grooves 5 are shown in greatly exaggerated form in comparison with reality. The depth of the groove 5 is referred to as the twist depth t while the spacing measured in the direction of rotation 10 between two turns of the burr 6 or the grooves 5 is referred to as the twist pitch s.

The cutting edge 2a can also be moved with respect to the workpiece 1 along an advance or feed movement 3' which is transverse with respect to the axis of rotation 10 and in particular perpendicular to the cutting edge 2a, in which case then a somewhat smaller width of the cutting edge 2a is required.

The twist pitch s depends on the broaching feed $f_r$ which gives the advance in the feed direction 3, measured in millimetres per revolution of the workpiece, and on the inclined positioning angle α, as follows:

$$s = \frac{f_r}{\tan\alpha}$$

The twist depth t depends on the radius (core diameter) as measured to the troughs between the burrs 6 of the workpiece at the surface 1a to be machined, and the broaching feed f, as follows:

$$t = -r + \sqrt{r^2 + \frac{f_r^2}{4}}$$

It will be clear from the view in FIG. 2 that, upon reaching a twist depth t=0 or at least t<1 μm, in particular t<0.4 μm, in particular t<0.2 μm, the magnitude of the twist pitch s no longer plays any part.

The primary intention therefore is to keep the broaching feed $f_r$ as low as possible, and in particular so low that the twist depth t becomes substantially smaller, in particular at least by a factor of 3, and better by a factor of 5, than the roughness depth $R_z$ of the surface produced in that way. The roughness depth $R_z$ is usually in the range of between 1.5 μm and 6 μm.

While the invention has been described with a certain degree of particularly, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

| LIST OF REFERENCES | |
|---|---|
| 1 | workpiece |
| 1a | rotationally symmetrical surface |
| 2 | tool |
| 2a | cutting edge |
| 3, 3' | feed movement |
| 4 | tangent |
| 5 | groove |
| 6 | burr |
| 7 | direction of rotation |
| 8 | working line |
| 10 | Z-direction, axis of rotation |
| 11 | X-direction |
| 12 | Y-direction |
| f | feed |
| $f_r$ | broaching feed |
| α | inclined positioning angle |
| r | workpiece radius |
| s | twist pitch |
| t | twist depth |
| b | width of the surface 1a |
| $R_z$ | roughness depth |

What is claim is:

1. A process for cutting machining of rotationally symmetrical cylindrical surfaces of a rotating workpiece, said process comprising:

establishing linear feed directions for a cutting edge chosen from a plurality of planes;

guiding a horizontally askewed cutting edge that is inclined with respect to the rotational axis of the workpiece in linear feed direction that is tangent to a reference or target of the rotationally symmetrical cylindrical surface of the workpiece in contacting relationship along the rotating workpiece; and selecting the machining parameters of a broaching feed and the inclined position of the cutting edge so that a twist which occurs at the machined surface becomes a minimum in respect to a twist depth.

2. A process according to claim 1 wherein said linear feed movement takes place in a tangential plane of said rotationally symmetrical surface.

3. A process according to claim 1 wherein said horizontally askewed cutting edge is straight.

4. A process according to claim 1 wherein said inclined positioning of said horizontally askewed cutting edge with respect to the axis of rotation is between 0° and 90°.

5. A process according to claim 1 wherein said broaching feed relative to said inclined positioning of said horizontally askewed cutting edge, and a diameter of said rotationally symmetrical cylindrical surface to be machined, is so selected that grooves produced on the surface of said workpiece by the machining operation, in terms of said twist pitch and said twist depth, have no screwthread effect or a negligibly slight screwthread effect.

6. A process according to claim 1 wherein said inclined positioning of said horizontally askewed cutting edge with respect to the axis of rotation is between 20° and 50°.

7. A process for cutting machining of rotationally symmetrical cylindrical surfaces with a rotating workpiece, said processing comprising:

establishing linear feed directions for a cutting edge chosen from a plurality of planes;

guiding a horizontally askewed cutting edge that is inclined with respect to an axis of rotation of the workpiece in a linear feed direction that is tangent to a reference or target diameter of the rotationally symmetrical surface, and selecting machining parameters, including a broaching feed, when machining a hardened rotationally symmetrical cylindrical surface, so that the resulting material removal rate becomes a maximum.

8. A process according to claim 7 wherein said linear feed movement takes place in a tangential plane of said rotationally symmetrical surface.

9. A process according to claim 7 wherein said horizontally askewed cutting edge is straight.

10. A process according to claim 7 wherein an inclined positioning of said horizontally askewed cutting edge with respect to the axis of rotation is between 0° and 90°.

11. A process according to claim 7 wherein said broaching feed relative to said inclined positioning of said horizontally askewed cutting edge, and a diameter of said rotationally symmetrical cylindrical surface to be machined, is so selected that grooves produced on the surface of said workpiece by the machining operation, in terms of a twist pitch and a twist depth, have no screwthread effect or a negligibly slight screwthread effect.

12. A process according to claim 7 wherein an inclined positioning of said horizontally askewed cutting edge with respect to the axis of rotation is between 20° and 50°.

* * * * *